(12) United States Patent
Ichikawa et al.

(10) Patent No.: US 8,023,240 B2
(45) Date of Patent: Sep. 20, 2011

(54) OPERATING DEVICE

(75) Inventors: Yuichi Ichikawa, Tokyo (JP); Akiko Ogata, Tokyo (JP)

(73) Assignee: Hoya Corporation, Tokyo (JP)

( * ) Notice: Subject to any disclaimer, the term of this patent is extended or adjusted under 35 U.S.C. 154(b) by 658 days.

(21) Appl. No.: 12/169,055

(22) Filed: Jul. 8, 2008

(65) Prior Publication Data

US 2009/0016711 A1    Jan. 15, 2009

(30) Foreign Application Priority Data

Jul. 10, 2007   (JP) ................. 2007-180848

(51) Int. Cl.
*H01H 73/00* (2006.01)
(52) U.S. Cl. ...................................... 361/115
(58) Field of Classification Search ................... 361/115
See application file for complete search history.

(56) References Cited

U.S. PATENT DOCUMENTS 5,821,480 A    10/1998  Machida
7,335,841 B2 *  2/2008  Ozawa et al. ............. 200/50.36

FOREIGN PATENT DOCUMENTS

JP    9-073843 A    3/1997

OTHER PUBLICATIONS

English language Abstract of JP 9-073843 A.
U.S. Appl. No. 12/164,416 to Ichikawa et al., which was filed Jun. 30, 2008.

* cited by examiner

*Primary Examiner* — Stephen W Jackson
(74) *Attorney, Agent, or Firm* — Greenblum & Bernstein, P.L.C.

(57) ABSTRACT

An operating device is provided having a first button, a second button, and a regulating member. The first button has a tubular hole having a bottom, and is able to be pressed in the direction from the opening edge of said tubular hole to the bottom. The second button freely fits the inside surface of said tubular hole on the outside surface of the second button. The regulating member engages the edge of the first button and regulates the movement of the first button in the pressing direction. The first button is swingable on its edge.

20 Claims, 6 Drawing Sheets

OPERATING DEVICE

BACKGROUND OF THE INVENTION

1. Field of the Invention

The present invention relates to an operating device, such as one which may be used in a portable device.

The present invention relates to an operating device, and more particularly, to an operating device which is provided in a portable device and controls the functions of the portable device.

2. Description of the Related Art

For example, an operating device may be used as a shutter-release button of a camera. A shutter-release button comprises a two-step switch which has two depth positions to which it may be depressed. When the user depresses the two-step button to its first depth position (halfway depression), the camera executes a pre-photographing operation, for example, photometry operation. After that, when the two-step button is depressed to the second depth position (full depression), the camera executes the photographing operation, i.e. it captures an image.

The reaction force on depressing to the second depth position is larger than to the first depth position, so that the user easily recognizes that a shutter-release button is divided into two positions. This construction is disclosed in Japanese Unexamined Patent Publication (KOKAI) No. 9-73843.

However, the differential between the reaction force of the second depth position, and that o the first depth position is little, so that the user may depress the second depth position when the user intends to depress only the first step. In the case that the user wears groves, this tendency becomes more remarkable.

SUMMARY OF THE INVENTION

An object of the present invention is to provide an operating device which is easily recognised as a two-step switch by the user.

An operating device is provided having a first button, a second button, and a regulating member. The first button has a tubular hole having a bottom, and is able to be pressed in the direction from the opening edge of the tubular hole to the bottom. The second button freely fits the inside surface of the titular hole on the outside surface of the second button. The regulating member engages the edge of the first button and regulates the movement of the first button in the pressing direction. The first button is swingable on its edge.

BRIEF DESCRIPTION OF THE DRAWINGS

The objects and advantages of the present invention will be better understood, from the following description, with reference to the accompanying drawings in which.

DESCRIPTION OF THE PREFERRED EMBODIMENTS

The present invention is described below with reference to the embodiments shown in the drawings.

The first embodiment of the operating device 200a is described below with reference to FIGS. 1 to 4.

Figure 1:
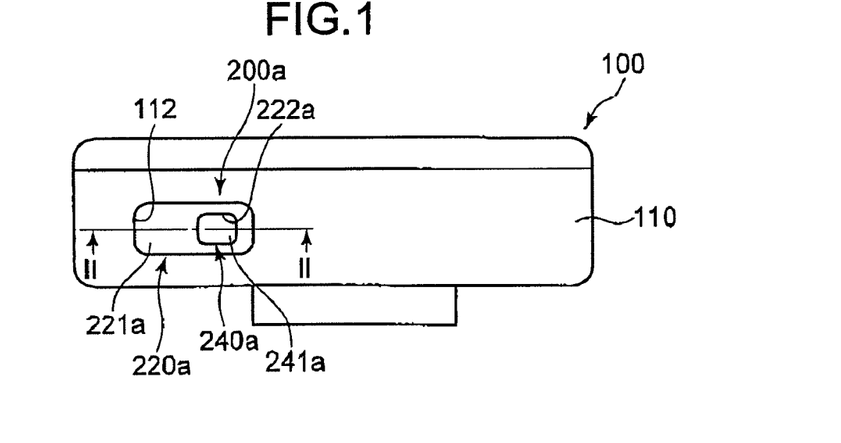
FIG. 1 is a top plan view of a camera having an operating device, as the first embodiment of the present invention.

An operating device 200a comprising a first button 220a and a second button 240a, is provided on surface 110 of camera 100. The first depressing surface 221a and the second depressing surface 241a are approximately rectangular, and are exposed from a button hole 112 which is provided on the top surface 110. The first depressing surface 221a comprises an opening 222a which has the approximately rectangular opening edge 229a. The opening 222a is provided on the top surface 110 with bias towards the center of the top surface 110.

Figure 2:
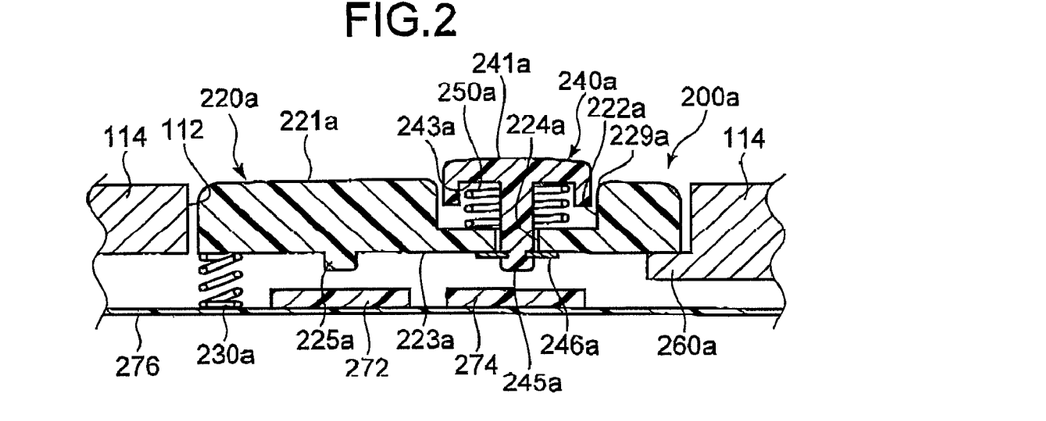
FIG. 2 is a cross-sectional view of the operating device, taken along line II-II of FIG. 1.

The operating device 200a is described below with reference to FIG. 2 in the case that button 210 is not depressed.

The opening 222a of the first button 220a is cylindrical with a bottom, and has a depth of approximately ⅓ the thickness of the first button 220a. The fitting hole 224a is provided at the bottom of the opening, and opening 222a of the first button 220a is cylindrical with a bottom, and penetrates to the back surface 223a of the first depressing surface 221a. The first projecting portion 225a is located on the back surface 223a apart from the fitting hole 224a. One of the narrow sides of the back surface 223a which is near the opening 222a engages the regulating member 260a. The regulating member 260a projects from the exterior member 114 of the camera 100, and across the entire length of the narrow side of the opening 222a. Therefore, the movement of the narrow side of the opening 222a towards the interior of the camera 100 is regulated, so that the first button 220a swings around the regulating member 260a.

The second button 240a comprises the second projecting portion 245a which extends from the back surface 243a of the second depressing surface 241a to the inner side of the camera 100. A dent portion which engages the second compression spring 250a (the second elastic member) is formed on the back surface 243a. The second compression spring 250a is a helical spring. The second compression spring 250a is provided coaxially with the second projecting portion 245a, and engages the dent portion and the bottom of the opening 222a.

The end of the second projecting portion projects from the back surface 223a, and engages the e-clip 246a. The e-clip 246a engages the back surface 223a, and prevents the shaft of the second projecting portion 240a from coming out of the fitting hole 224a. When the e-clip 246a engages the back surface 223a of the first depressing surface 221a, the distance between the back surface 243a of the second depressing surface 241a and the bottom of the opening 222a is shorter than the free length of the second compression spring 250a. Therefore, the second compression spring 250a biases the second depressing surface 241a toward the outside of the camera 100. The biased second button 240a thus projects its second depressing surface 241a beyond the first depressing surface 221a.

The first push switch 272 and the second push switch 274 are provided opposite the first projecting portion 225a and the second projecting portion 245a. The first push switch 272 and the second push switch 274 are fixed to the support member 276.

The first compression spring 230a (the first elastic member) is provided on the swinging end of the first button 220a and between the back surface 223a of the first depressing surface 221a and the support member 276. The first compression spring 230a is a helical spring which keeps the first button 220a from falling toward the inside of the camera 100, and holds the first button 220a such that its first depressing surface 221a and the top surface 110 of the camera 100 form an approximately even surface. When pressed by the user the first compression spring 230a produces a reaction force. The spring modulus of the first compression spring 230a is larger than that of the second compression spring 250a. Therefore, even if the first button 220a is pressed by the second button 240a, it does not move.

Figure 3:
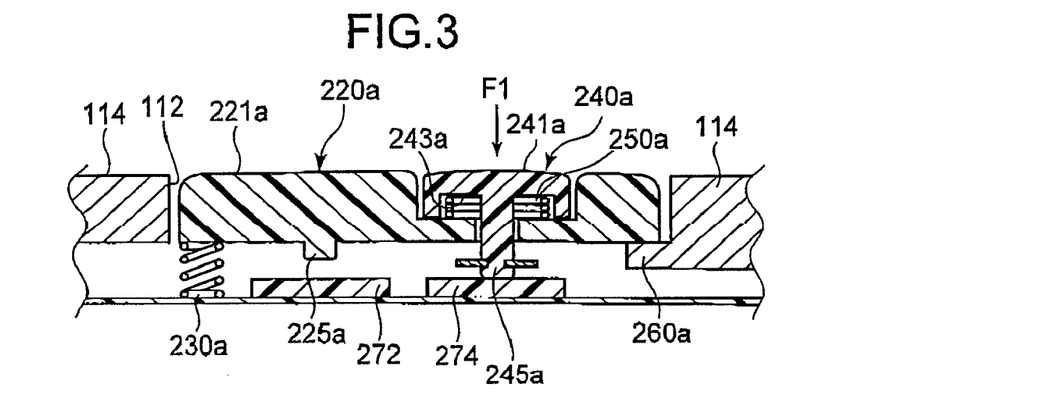
FIG. 3 is a cross-sectional view of the depressed second button.

Movement of the operating device 200a is described below with reference to FIGS. 3 and 4. FIG. 3 shows the depressed second button 240a.

When the user increases force F1 on the second depressing surface 241a, the second button 240a is pushed down so that the second depressing surface 241a becomes approximately flush with the first depressing surface 221a. The second projecting portion 245a which projects from the back surface 243a of the second depressing surface 241a presses the second push switch 274. Thereby a signal is sent to the DSP which controls the camera 100, and then the camera 100 executes the photographing preparation operation which is executed before photographing. For example, the photographing preparing operation may include photometry operation.

Figure 4:
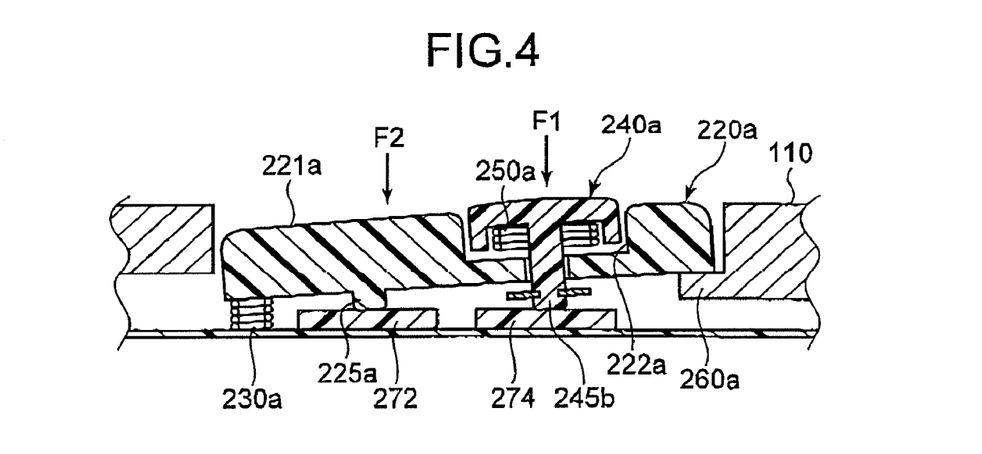
FIG. 4 is a cross-sectional view of the depressed first button after the second button is depressed.

FIG. 4 shows the depressed first button 220a.

After the user depresses the second button 240a, the user applies the depressing power F2 on the first depressing surface 221a. At this time, the first button 220a may swing around the regulating member 260a which acts as a fulcrum, because the end of the first button 220a near the opening 222a engages the regulating member 260a. Then, the first projecting portion 225a presses the first push switch 272. The depressed first push switch sends signals to the DSP, and then the DSP controls the camera 100 to execute photographing operation.

The first depressing surface 221a extends further outward along the length of top surface 110 (i.e., more laterally) than the second depressing surface 241a. Therefore, the user may depress the first depressing surface 221a without changing finger placement on the second button 240a. Holding the camera 100, the user may execute the photographing preparation operation by depressing the second button 240a with the tip of a bent index finger, and after, may execute the photographing operation by depressing the first button 220a with the ball of the index finger.

The first embodiment prevents the user from taking a photograph by mistake, because the button which executes the photographing preparation operation and the button which executes the photographing operation itself are separate.

The second embodiment of the operating device 200b is described below with reference to FIGS. 5 to 7. Descriptions of constructions similar to those of the first embodiment described above are omitted.

Figure 5:
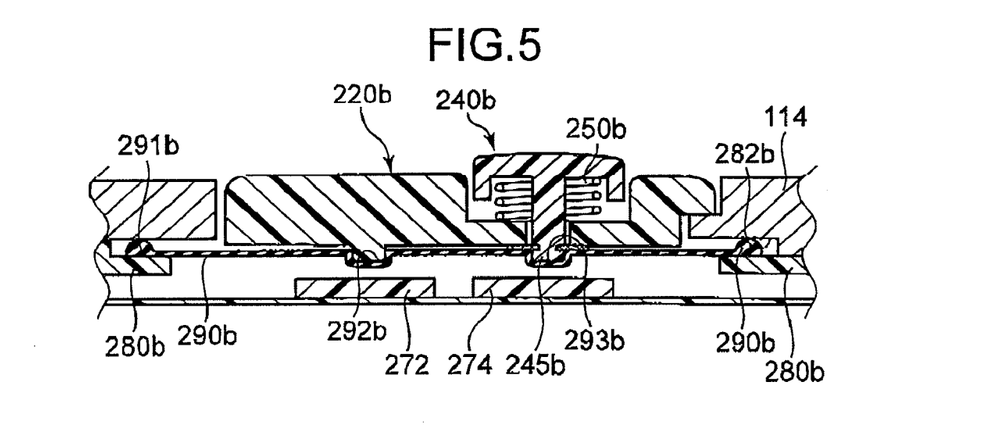
FIG. 5 is a cross-sectional view of an operating device a second embodiment of the present invention.

FIG. 5 shows the operating device 200b when not depressed by the user.

The holding member 280b is provided on the inner surface of the exterior member 114 of the camera 100. The holding slit 282b is provided between the holding member 280b and the exterior member 114, and surrounds the first button 220b.

The holding slot holds the third elastic member 290b which has the form of a plate. The end of the third elastic member 290b has a flange 291b. The flange 291b engages the whole circumference of the holding slit 282b and covers the button hole 112 to prevent intrusion of dust or water into the camera 100. The first dent portion 292b and the second dent portion 293b are provided in the third elastic member 290b. The first dent portion 292b engages the first projecting portion 225b. The second dent portion 293b engages the second projecting portion 245b. The third elastic member 290b prevents the first button 220b from falling down toward the camera 100, and holds the first button 220b so that the first depressing surface 221b and the top surface 110 are approximately flush. This construction prevents intrusion of water into the camera.

Movements of the operating device 200b is described below with reference to FIGS. 6 and 7.

Figure 6:
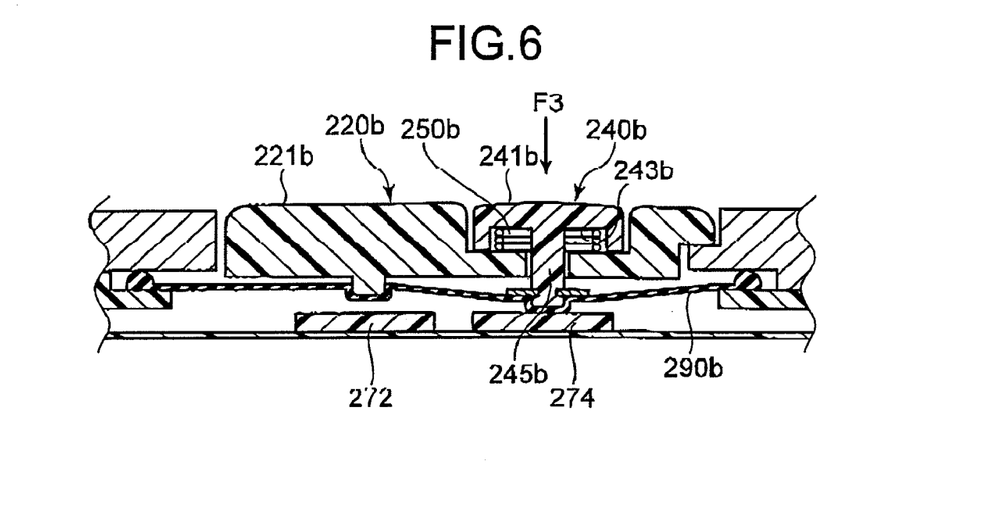
FIG. 6 is a cross-sectional view of the depressed second button.

FIG. 6 shows the second button 240b when it is pressed. When the user applies force F3 onto the second depressing surface 241b, the second button 240b is pressed down so that the second depressing surface 241b and the first depressing surface 221b are approximately flush. The second projecting portion 245b projects from the beck surface of the second depressing surface 241b, and depresses the third elastic member 290b so as to stretch it, thereby pressing the second push switch 274. The spring constant (elastic modulus) of the third elastic member 290b and the second elastic member 250b are adjusted so that the first button 220b drops towards the inside of the camera 100 when the third elastic member 290b is stretched by the second projecting portion 245b.

Figure 7:
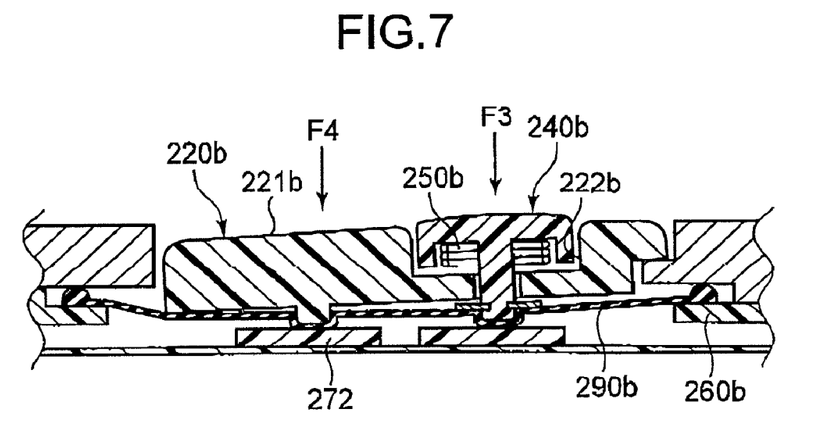
FIG. 7 is a cross-sectional view of the depressed first button.

FIG. 7 shows the first button 220b in its depressed state. The user depresses the second button 240b, and then exerts force F4 onto the first depressing surface 221b. At this moment, the end of the first button 220b near the opening 222b engages the regulating member 260b, so that the first button 220b swings on the end which acts as a fulcrum. Thereafter, the first projecting portion 225b depresses the third elastic member 290b so as to stretch it, so as to depress the first push switch 272.

According to this embodiment, the third elastic member 290b prevents water and dust from entering the camera 1100 and prevents the user from inadvertently taking a photograph.

Figure 8:
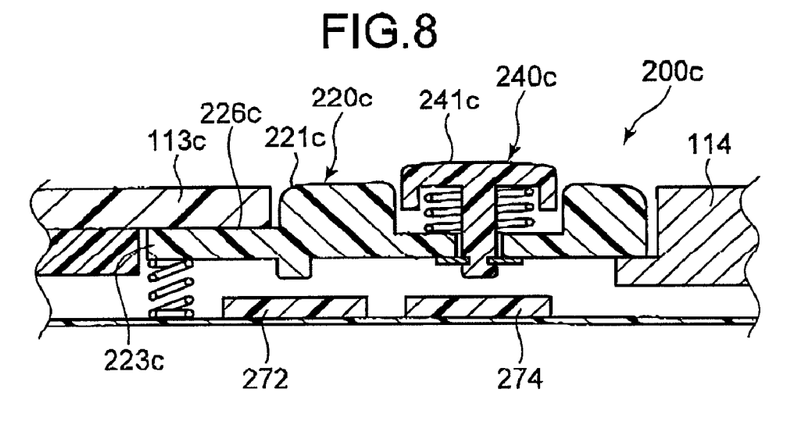
FIG. 8 is a cross-sectional view of an operating device in a third embodiment of the present invention.

The third embodiment of the operating device 200c is described below with reference to FIG. 8. Descriptions of constructions similar to those of the first embodiment described above are omitted.

The exterior member 114 of the camera 100 has the overhanging portion 113c which projects toward the swinging end 223c of the first button 220c so as to cover a part of the first depressing surface 221c. The overhanging portion 113c is provided across the entire width of the swinging end 223c. The swinging end 223c has the shoulder portion 226c which engages the overhanging portion 113c.

Next, the movement of the operating device 200c is described.

To depress the operating device 200c, the user puts a finger on the first and second depressing surface 221c and 241c. Therefore, the force is increased on the first depressing surface 221c when the second button 240c is pressed. However, the user cannot press the first depressing surface 221c, because approximately half of the first depressing surface 221c is covered by the overhanging portion 113c. Therefore, the second button 240c is pressed earlier than the first button 220c.

This embodiment prevents the first button 220c from being pressed earlier than the second button 240c, and prevents the camera 100 from photographing before it has completed the pre-photographing operation.

Figure 9:
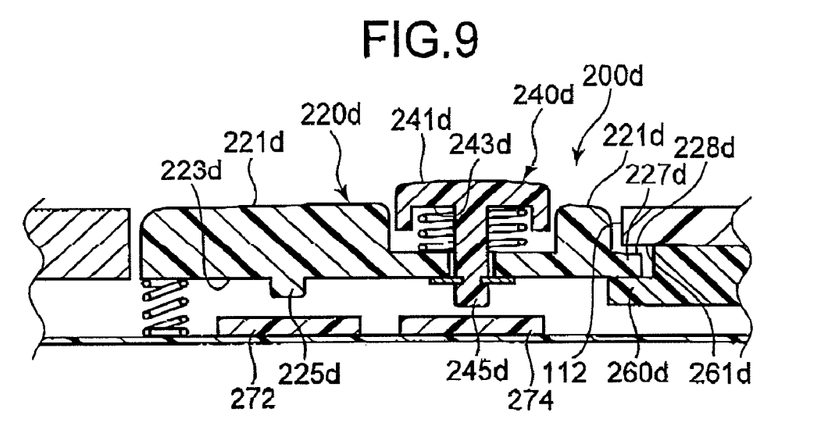
FIG. 9 is a cross-sectional view of an operating device in a fourth embodiment of the present invention.
Figure 10:
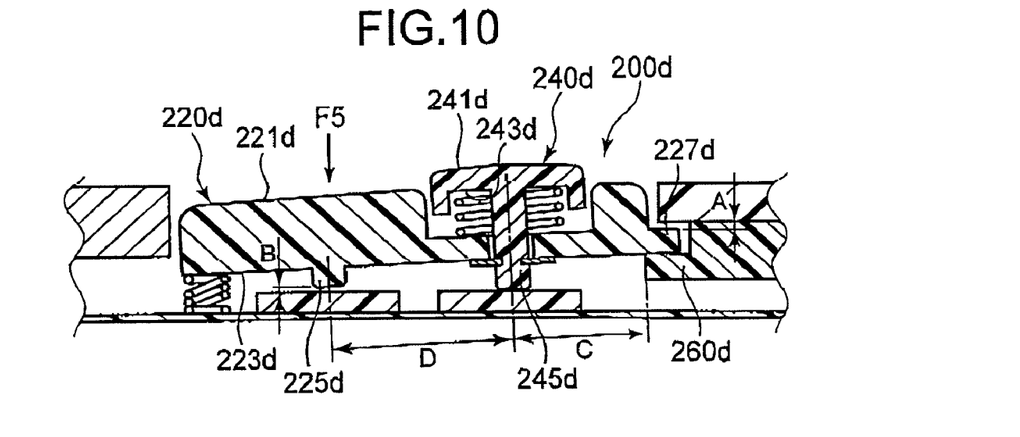
FIG. 10 is a cross-sectional view of the depressed first button.
Figure 11:
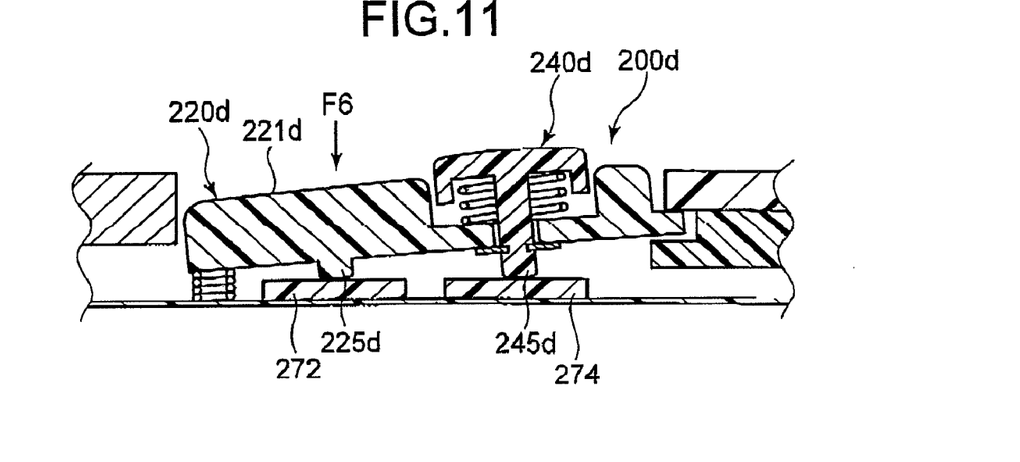
FIG. 11 is a cross-sectional view of the further depressed first button.

The fourth embodiment of the operating device 200d is described below with reference to FIGS. 9 to 11. Descriptions of constructions similar to those of the first embodiment described above are omitted.

The projecting length of the second projecting portion 245d from the back surface 223d of the first depressing surface 221d is greater than the projecting length of the first projecting portion 225d from the back surface 223d. The second shoulder 228d is provided at the fulcrum end 227d of the first button 220d. The regulating member 260d has the groove 261d which is open towards the fulcrum end 227d. The groove 261d is provided along the whole length of the narrow side of the button hole 112 which faces the fulcrum end 227d. The fulcrum end 227d freely engages the groove 261d. The stair provided on the first depressing surface 221d and the inner surface of the first depressing surface 221d engage the inner surface of the grove 261d.

Movement of the operating device 200d is described below with reference to FIGS. 10 and 11.

When the user applies force PS onto the first depressing surface 221b without pressing the second depressing surface 241d, the first button 220d swings toward the inside of the camera 100 on the fulcrum formed by the contact point of the inside surface of the camera 100 and the regulating member 260d. The second projecting portion 245d presses the second push switch 274 before the first projecting portion 225d depresses the first push switch 272, because the projecting length of the second projecting portion 245d from the back surface 243d of the second depressing surface 241d is greater than the projecting length of the first projecting portion 225d from the back surface 223d of the first depressing surface 221d.

After that, the user additionally applied force F6 onto the first depressing surface 221d, the operating device 220d swings on the fulcrum which is the second projecting portion 245d and the second push switch 274. After the first button 220d is depressed, the first projecting portion 225d presses the first push switch 272. The first push switch 272 sends signals to the DSP. The DSP controls the camera to take photographs. The lengths A, B, C, and D of operating device 220d have the relationship A>B*C/D.

According to this embodiment, the user may depress the first push switch 272 earlier than the second push switch 274, enabling the DSP to execute the pre-photographing operation before the photographing operation is executed. Additionally, by only pressing the first button 220d, the pre-photographing operation and the photographing operation are executed in order.

Figure 12:
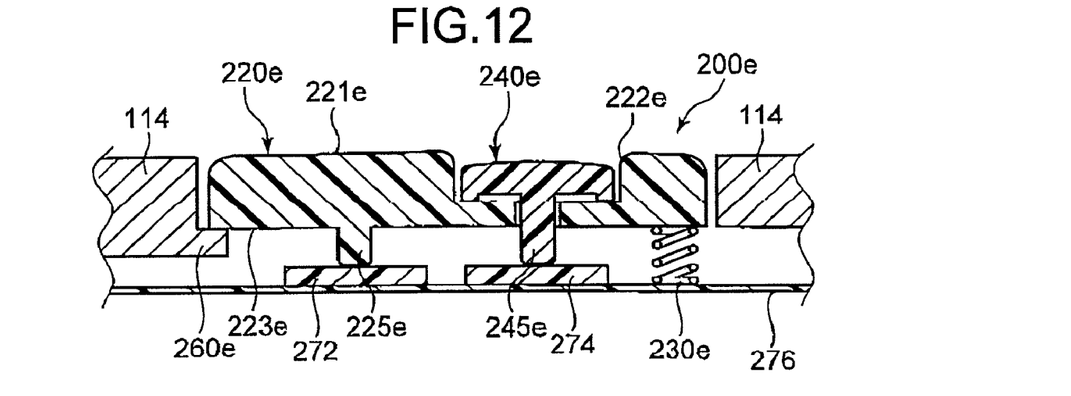
FIG. 12 is a cross-sectional view of an operating device in a fifth embodiment of the present invention.

The fifth embodiment of the operating device 200e is described below with reference to FIGS. 12 to 14. Descriptions of constructions similar to those of the first embodiment described above are omitted.

The construction of the operating device 200e is described below with reference to FIG. 12. FIG. 12 shows the operating device 200e in an undepressed state.

In this embodiment, the camera 100 executes the pre-photographing operation when the first button 220e is pressed, and the photographing operation when the second button 240e is pressed.

The back surface 223e is located in the narrow side which is near the opening 220e, and engages the regulating member 260e which projects from the exterior member 114 of the camera 100. The narrow side is restricted to move toward the inside of the camera 100, so that the first button 220e swings on the narrow side. The second elastic member is not provided between the button 240e and the bottom of the opening 222e, therefore the second button 240e is supported by the second push switch 274 so that the second projecting portion 245e engages the second push switch 274.

The first push switch 272 and second push switch 274 are soldered to the substrate (supporting portion) 276, and face the first projecting portion 225e and second projecting portion 245e, respectively. The first compression spring 230e is provided as the first elastic member between the back surface 223e of the first depressing surface 221e and the supporting member 276. The movement of the first compression spring 230e is similar to the first compression spring 230a, therefore the description is omitted.

The operating device 220e is described with reference to FIGS. 13 and 14.

Figure 13:
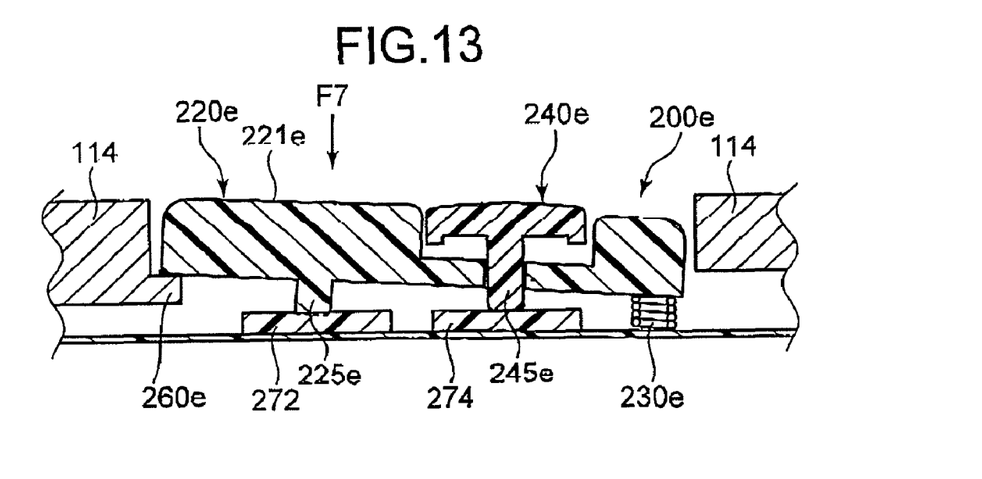
FIG. 13 is a cross-sectional view of the depressed second button.

FIG. 13 shows the pressed first button 220e when the user applies the force F7 onto the first depressing surface 221e. The end which is near the opening 222e of the first button 220e engages the regulating member 260e, so that the first button 220e swings on the end. The first projecting portion 225e presses the first push switch 272. The pressed first push switch 272 sends signals to the DSP. The DSP executes the pre-photographing operation(s) which is needed, such as photometry, focusing, etc.

Figure 14:
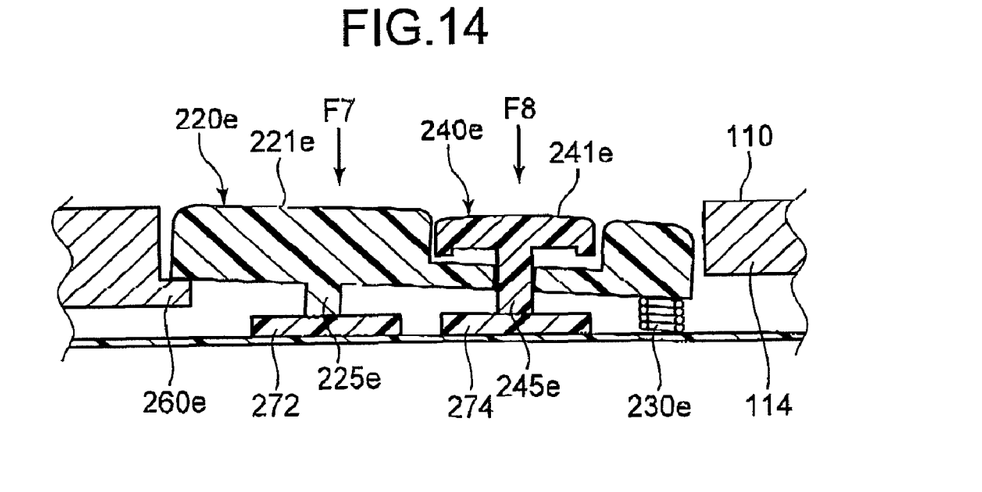
FIG. 14 is a cross-sectional view of the depressed first button.

FIG. 14 shows the pressed second button 240e.

When the user applies force F8 onto the second depressing surface 241e after pressing the first button 220e, the second projecting portion 245e presses the second push switch 274. The second push switch 274 sends signals to the DSP. The DSP which receives the signals executes the photographing operation.

The first depressing surface 221e is located farther outward in the lengthwise direction on the top surface 110 than the second depressing surface 241e. The first button 220e is provided near the finger the user uses to operate the operating device 200e, so that the user rapidly presses the first button 220e for executing the pre-photographing operation and is able to avoid taking a photograph before the pre-photographing operation.

The sixth embodiment of the operating device 200f is described below with reference to FIGS. 15 to 18. Descriptions of constructions similar to those of the first embodiment described above are omitted.

Figure 15:
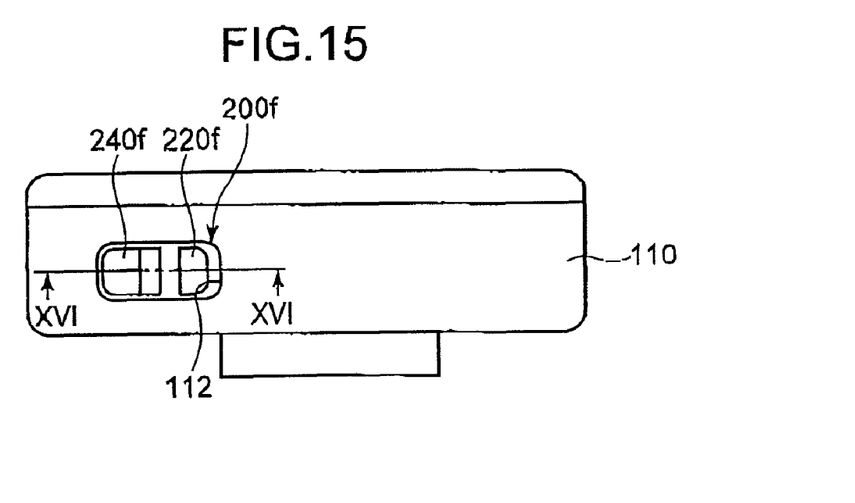
FIG. 15 is a top plan view of an operating device in a sixth embodiment of the present invention.

The operating device 200f has the first slide button 220f and the second slide button 240f, and is provided in the rectangular top surface 110. First slide button 220f and second slide button 240f are installed in hole 112 in top surface 110. The first slide button 220f and the second slide button 240f are aligned with intervening space along the longitudinal direction of the installation hole 112. The first slide button 220f may be depressed by the user toward the second slide button 240f. The second slide button 240f is movable in the pressing direction of the first slide button 220f, and may be pushed by the first slide button 220f.

Figure 16:
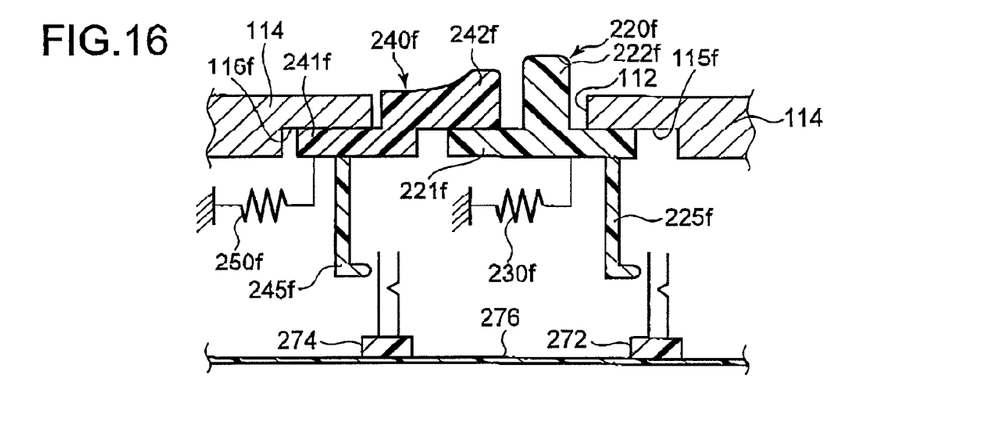
FIG. 16 is a cross-sectional view of the operating device taken along line XVI-XVI of FIG. 15.

The construction of the operating device 200f is described below with reference to FIG. 16. FIG. 16 shows the operating device 200f in its unpressed state.

The first slide button 220f comprises the first base 221f which is in the form of a plate and provided on the inner surface of the exterior member 114, and the first pressing projection 222f which is provided approximately at the center of the first base 221f along the longitudinal direction. The first pressing projection 222f extends perpendicular to the first base 221f from the first base 221f toward the outside of the camera 100, and protrudes from the installation hole 112.

The first projecting portion 225f projects from the surface of the first base 221f which faces the inside of the camera 100. The end of the first projecting portion 225f is bent in the pressing direction of the first projecting portion 225f giving it an L-shape in the cross-sectional plane.

The second slide button 240f comprises the second base 241f which is provided on the inner surface of the exterior member 114, and the second projection 242f which is formed with the second base 241f as a unit and projects from the button hole 112. The second projection 242f has a slope which away from the camera 100 and in the pressing direction. The slope rises slightly less than the height of the first projection 222f, and the top of the slope forms a flat surface.

The second projecting portion 245f projects from the surface of the second base 241f which faces the inside of the camera 100. The end of the second projecting portion 245f is bent in the pressing direction of the second projecting portion 245f giving it an shape in the cross-sectional plane. The surface of the second projecting portion 242f which faces the inside of the camera 100 slidably engages the outside surface of the camera 100.

The first engaging portion 115f and the second engaging portion 116f are provided on the narrow sides of the button hole 112, and engage the first base 221f and the second base 241f, respectively. The surface of the first base 221f located near the narrow side of the button hole 112 engages the first engaging portion 115. The surface of the second base 241f located near the narrow side of the button hole 112 engages the second engaging portion 116f.

The first push switch 272 is provided facing the end of the first projecting portion 225f. The second push switch 274 is provided facing the end of the second projecting portion 245f. The first and second push switches 272 and 274 are soldered onto the substrate 276.

The first tension spring 230f is provided on the inner surface of the first base 221f as the first elastic member. The second tension spring 250f is provided on the inner surface of the second base 241f as the second elastic member. The first tension spring 230f is fixed onto the case of the camera 100 and biases the first slide button 220f in the direction opposite the pressing direction. The second tension spring 250f is fixed onto the case of the camera 100 and biases the second slide button 240f in the direction opposite the pressing direction.

The movement of the operating device 200f is described with reference to FIGS. 17 and 18.

Figure 17:
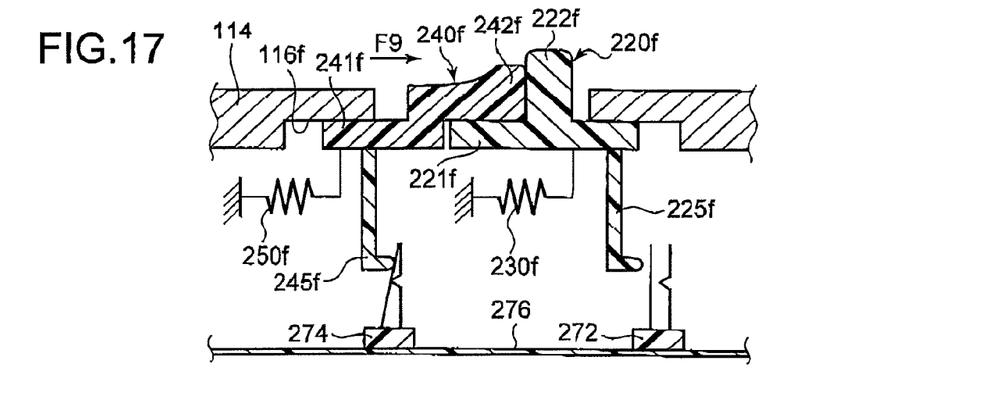
FIG. 17 is a cross-sectional view of the depressed second slide button.
Figure 18:
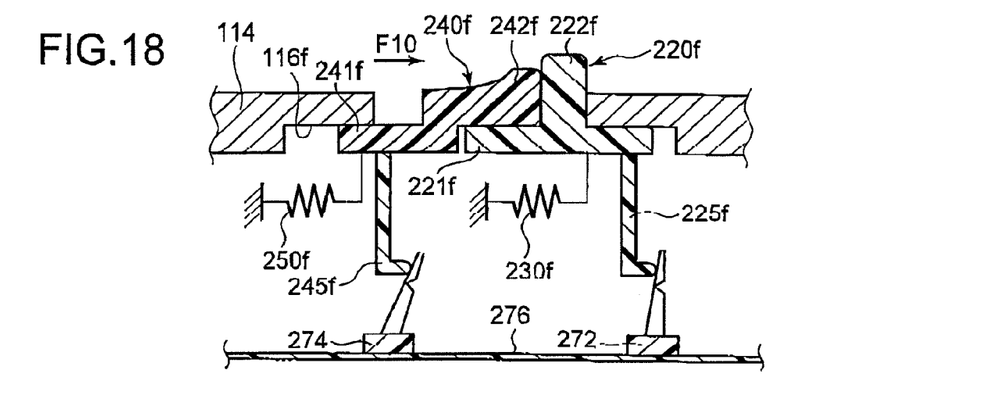
FIG. 18 is a cross-sectional view of the depressed first slide button.

FIG. 17 shows the pressed second slide button 240f. When, the user applies force F9 onto the second projecting portion 242f, the second slide button 240f slides against the second projecting portion 242, bumping into the first projecting portion 222f. The second projecting portion 245f presses the second push switch 274. When the second push switch 274 is pressed, it sends a signal to the DSP which controls the camera 100, and the camera 100 executes pre-photographing operation(s) such as photometry.

FIG. 1B shows the operating device 200f when the first slide button 220f is pressed. After the second slide button 240f slides against the first slide button 220f, the user additionally applies force F10 onto the second projecting portion 242f. The first slide button 220f is pressed by the second projecting portion 242f so that the first slide button 220f slides in the pressed direction. The first and second tension springs 230f and 250f oppose the force F10. Therefore, the force F10 must be larger than the force F9.

The user will easily distinguish the resistance of the first step from that of the second step of operating device 200f. This prevents the user from inadvertently pressing farther than intended.

The first push switch 272 is pressed by the first projecting portion 225f which projects from the first slide button 220f. The pressed first push switch 272 sends a signal to the DSP, and the DSP executes the photographing operation.

According to the embodiment, the button which is for executing the pre-photographing operation and the button which is for executing the photographing operation are separate, thereby preventing the user from inadvertently taking a photograph.

Note that, the elastic members described as compressing springs may be leaf springs or rubber pieces with elasticity.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-180848 (filed on Jul. 10, 2007), which is expressly incorporated herein, by reference, in its entirety.

The invention claimed is:

1. An operating device comprising:
    a first button that has a tubular hole having a bottom, and is pressible in a pressing direction that extends from an opening edge of said tubular hole to the bottom of said tubular hole;
    a second button having an outer surface that freely fits within an inner surface of said tubular hole;
    a regulator that engages an edge of said first button and regulates movement of said first button in the pressing direction; and
    said first button being swingable about the edge of said first button.

2. The operating device according to claim 1, wherein said first button comprises a first depressing surface on which said tubular hole is provided and a first projecting portion which projects from a back of said first depressing surface in the pressing direction, and said second button comprises a second depressing surface which faces approximately the same direction as said first depressing surface faces and a second projecting portion which projects from a back of said second depressing surface in the pressing direction and freely engages a fitting hole provided in the bottom of said tubular hole.

3. The operating device according to the claim 2, further comprising:
    a first switch that faces said first projecting portion;
    a second switch that faces said second projecting portion;
    a support member on which said first switch and said second switch are provided;

a first elastic member that is provided between said first button and said support member and supports said first button so as to be spaced from said support member; and a second elastic member that is provided between said second button and the bottom of said tubular hole and supports said second button so as to be spaced from the bottom of said tubular hole.

4. The operating device according to the claim 3, wherein the elastic modulus of said first elastic member is larger than the elastic modulus of said second elastic member.

5. The operating device according to the claim 2, further comprising a third elastic member that extends over the back of said first depressing surface, said first projecting portion, the back of said second depressing surface, and said second projecting portion.

6. The operating device according to the claim 2, further comprising:

an overhanging portion that engages a swinging end of said first depressing surface; and said overhanging portion preventing said first button from being pressed before said second button is pressed.

7. The operating device according to the claim 1, wherein said first button has a first projecting portion which projects from a back of a first depressing surface in the pressing direction, said second button has a second projecting portion which projects from a back of a second depressing surface in the pressing direction so as to freely fit a fitting hole which is provided in the bottom of said tubular hole, and a projecting length of said second projecting portion from the back of said second depressing surface is longer than a projecting length of said first projecting portion from the back of said first depressing surface.

8. An operating device comprising:

a first button that has a first pressing surface and a first sliding surface, and is movable in a first direction;

a second button that has a second pressing surface that is pressible by the first pressing surface and a second sliding surface which slidably engages the first sliding surface, and is movable in the first direction;

a first elastic member that biases said first button in a second direction which is opposite to the first direction;

a second elastic member that biases said second button in the second direction; and said first pressing surface pressing said second pressing surface so that said second button moves in the first direction.

9. A camera having an operating device comprising:

a first button that has a tubular hole having a bottom, and is pressible in a pressing direction that extends from an opening edge of said tubular hole to the bottom of the tubular hole;

a second button having an outer surface that freely fits an inner surface of said tubular hole;

a regulator that engages an edge of said first button and regulates movement of said first button in the pressing direction; and said first button begin swingable about the edge of said first button.

10. A camera having an operating device comprising:

a first button that has a first pressing surface and a first sliding surface, and is movable in a first direction;

a second button that has a second pressing surface that is pressible by the first pressing surface and a second sliding surface which slidably engages the first sliding surface, and is movable in the first direction;

a first elastic member that biases said first button in a second direction which is opposite to the first direction;

a second elastic member that biases said second button in the second direction; and said first pressing surface pressing said second pressing surface so that said second button moves in the first direction.

11. A waterproof camera having an operating device comprising:

a first button that has a tubular hole having a bottom, and is pressible in a pressing direction that extends from an opening edge of said tubular hole to the bottom;

a second button having an outer surface that freely fits an inner surface of said tubular hole;

a regulator that engages an edge of said first button and regulates movement of said first button in the pressing direction;

said first button begin swingable about the edge of said first button;

said first button comprising a first depressing surface on which said tubular hole is provided and a first projecting portion which projects from a back of said first depressing surface in the pressing direction;

said second button comprising a second depressing surface which faces approximately in the same direction as said first depressing surface and a second projecting portion which projects from a back of said second depressing surface in the pressing direction and freely engages a fitting hole provided in the bottom of said tubular hole; and a elastic member that extends over the back of said first depressing surface, said first projecting portion, the back of said second depressing surface, and said second projecting portion.

12. The waterproof camera according to the claim 11, further comprising:

a first switch that faces said first projecting portion;

a second switch that faces said second projecting portion;

a support member on which said first switch and said second switch are provided;

a first elastic member that is provided between said first button and said support member and supports said first button so as to be spaced from said support member; and a second elastic member that is provided between said second button and the bottom of said tubular hole and supports said second button so as to be spaced from the bottom of said tubular hole.

13. The waterproof camera according to the claim 12, wherein the elastic modulus of said first elastic member is larger than the elastic modulus of said second elastic member.

14. The waterproof camera according to the claim 11, further comprising:

an overhanging portion that engages a swinging end of said first depressing surface; and said overhanging portion preventing said first button from being pressed before said second button is pressed.

15. The camera according to the claim 9, wherein said first button comprises a first depressing surface on which said tubular hole is provided and a first projecting portion which projects from a back of said first depressing surface in the pressing direction, and said second button comprises a second depressing surface which faces approximately in the same direction as said first depressing surface and a second projecting portion which projects from a back of said second depressing surface in the pressing direction and freely engages a fitting hole provided in the bottom of said tubular hole.

16. The camera according to the claim 15, further comprising:

a first switch that faces said first projecting portion;

a second switch that faces said second projecting portion;

a support member on which said first switch and said second switch are provided;

a first elastic member that is provided between said first button and said support member and supports said first button so as to be spaced from said support member; and a second elastic member that is provided between said second button and the bottom of said tubular hole and supports said second button so as to be spaced from the bottom of said tubular hole.

17. The camera according to the claim 16, wherein the elastic modulus of said first elastic member is larger than the elastic modulus of said second elastic member.

18. The camera according to the claim 15, further comprising a third elastic member that extends over the back of said first depressing surface, said first projecting portion, the back of said second depressing surface, and said second projecting portion.

19. The operating member according to claim 1, said edge of said first button defining an extremity of said first button in a plane transverse to the pressing direction.

20. The camera according to claim 9, the edge of said first button defining an extremity of said first button in a plane transverse to the pressing direction.

* * * * *